J. J. PIERCE.
Wagon Brake.
No. 83,879. Patented Nov. 10, 1868.
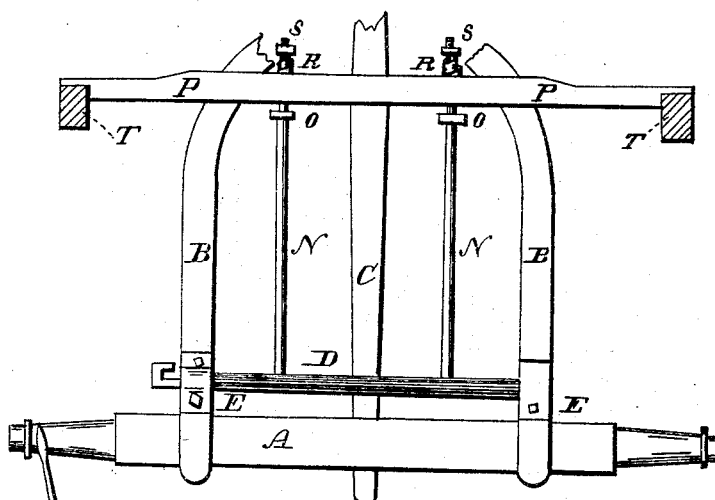
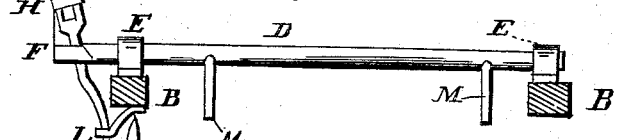
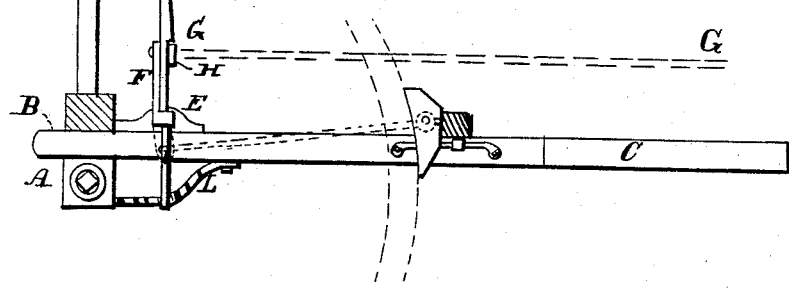
Witnesses. Inventor
Fred E. Bachelder Joseph J. Pierce
Thos. L. Harrison

JOSEPH J. PIERCE, OF MAQUOKETA, IOWA.

Letters Patent No. 83,879, dated November 10, 1868.

IMPROVEMENT IN WAGON-BRAKES.

The Schedule referred to in these Letters Patent and making part of the same.

*To all whom it may concern:*

Be it known that I, JOSEPH J. PIERCE, of Maquoketa, in the county of Jackson, and State of Iowa, have invented a new and useful Improvement in Wagon-Brakes; and I do declare that the following is a full, clear, and exact description of the construction and operation of the same, reference being had to the accompanying drawings, making a part of this specification, in which—

Figure 1 is a top view;

Figure 2, a view of the rock-shaft and lever, showing the mode of attachment of the same.

Figure 3 is a side elevation of the machine.

The subject of my invention is an improved wagon-brake, which may be used with or without the box or body of the vehicle.

A, in figs. 1 and 3, represents the axle of an ordinary wagon-gearing; B, the hounds; C, reach; D is a rock-shaft, the journals of which work in boxes, E E, secured to the hounds near their place of joining with the axle. At one end of the shaft D is a short arm or lever, F, the upper end of which is perforated, for receiving the long rod, shown by the dotted lines G G in fig. 3.

When the brake is arranged so as to be used with the box of the wagon from the driver's seat, it also has fitted to it, in such a manner as to turn easily, a T-headed bolt, H. The lever K has a slot, of sufficient size to admit the square head of the bolt H, when that is turned in a direction parallel to the length of the lever K, and secures it to the arm F, by turning the bolt-head so as to assume the position shown at H, fig. 2, allowing the lever to turn or oscillate on the centre H, in a direction parallel to the length of the rock-shaft. This is to allow the lower curved end of the lever K to engage with the notches of the rack L.

Near each end of the rock-shaft D are two short crank-arms, M M. These connect with the two parallel rods N N. These rods are provided with collars, O O, welded on near the opposite end. They then pass through holes in the brace-bar P, and through the centre of the coiled or volute-shaped springs R R, which are secured to the rods by means of the nuts S S. On either end of the bar P P are two brake-blocks, T T, arranged so as to engage with the tires of the wheels when the brake is set.

The operation is as follows: If the lever K be secured to the arm F by the bolt H, and it is desired to set the brake so as to retard the movement of the vehicle, the lever is thrown forward. This causes a partial rotation of the rock-shaft, and draws the rods N N toward the rear axle of the wagon. This compresses the springs R R against the bar P P, and presses the friction-blocks T T against the tire of the wheels. When sufficient amount of friction is obtained, and it is desired to continue its operation, the lever is moved on its centre, H, and its lower end is forced into any of the notches in the rack L. By reversing the operation, the brake is thrown off, or released. The object of the springs R R is to accommodate the pressure of the brake-bar P P to any irregularities in the conformation of the wheels.

When it is desired to use the brake with the box or body of the vehicle, the lever K is detached from the arm F, and the long rod, usually used for that purpose, indicated by *g g*, fig. 3, is attached to the end of the arm F, and the brake is operated in the usual manner, by means of a lever and rack near the seat of the driver.

What I claim as my invention, and desire to secure by Letters Patent, is—

The combination of the lever K, arm F, slot and bolt H, and rack L, the rock-shaft D, arms M M, rods N N, collars O O, springs R R, and bar P, the whole combined, arranged, and operating as described.

JOSEPH J. PIERCE.

Witnesses:
   J. M. WARDELL,
   LEVI MOSHER.